Sept. 26, 1933. L. B. WINTON 1,928,120
METHOD OF AND MEANS FOR FORMING OPENINGS IN RECEPTACLES
Filed April 29, 1930
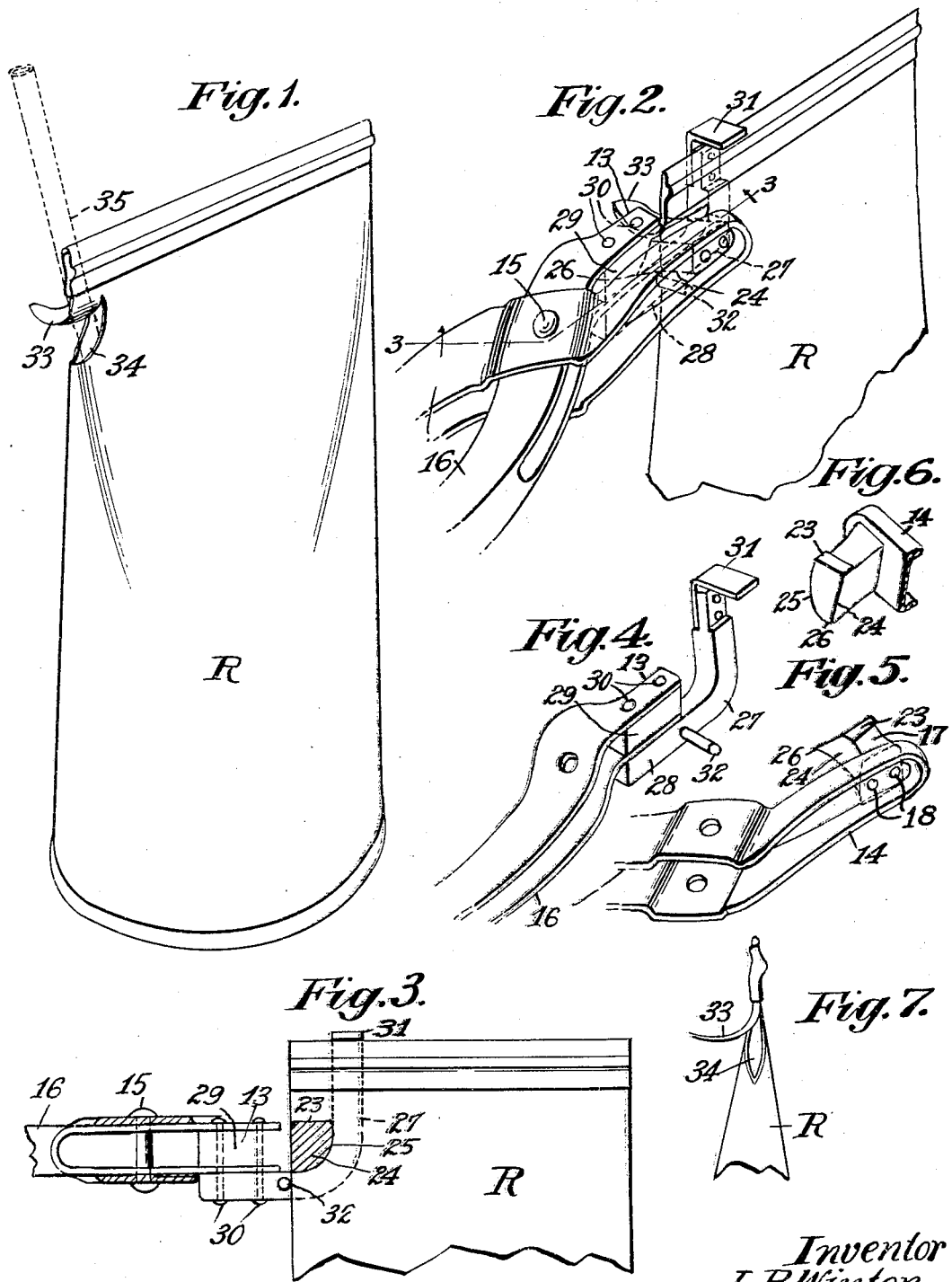
Inventor
L. B. Winton
By his Attorney
John O. Seifert Patented Sept. 26, 1933

1,928,120

UNITED STATES PATENT OFFICE 1,928,120

METHOD OF AND MEANS FOR FORMING OPENINGS IN RECEPTACLES

Lewis B. Winton, Greenwich, Conn., assignor, by mesne assignments, to American Sealcone Corporation, New York, N. Y., a corporation of New York Application April 29, 1930. Serial No. 448,268

3 Claims. (Cl. 164—121)

This invention relates to the perforating of receptacles made of pliable sheet material, such as paper, particularly receptacles of the type shown in Letters Patent No. 1,699,549, wherein the open end is closed by collapsing the same; that is, squeezing together the opposite wall portions at the opening and secured in said condition, whereby to arrange an opening in the receptacle through which to empty the contents from the receptacle, or for the insertion of a tube to drink the contents from the receptacle through the inserted tube, and it is the object of the invention to provide an improved method of and means for forming an opening in receptacles of this character through which to empty the contents therefrom.

It is a further object of the invention to provide a tool or implement for perforating and making an opening in a receptacle embodying a pair of jaws arranged with cutters and movable toward and away from each other and between which jaws the collapsed and closed end of a receptacle is adapted to be engaged, said cutters having cutting edges shaped to make an incision of the desired form and deflect the portion of the material within the incision laterally and produce an opening in the receptacle wall, said implement being provided with hand grips to manipulate the same, and means to position the perforation or opening in predetermined relation to the top of the receptacle, and when the perforation is arranged at the fold or the side of the collapsed receptacle to limit the width of the opening incision.

In the drawing accompanying and forming a part of this application, Figure 1 is a perspective view of a container arranged with a perforation or opening by my improved method and means and showing in dotted lines a tube inserted into the opening through which to drink the contents of the receptacle.

Figure 2 is a perspective view of the cutter carrying jaw portion of the implement in relation to a collapsed and closed end of a receptacle and arranged with cutter mechanism to form an opening as shown in Figure 1 and provided with means to position the perforation in predetermined relation to the top of the receptacle and limit the width of the perforation relative to the side thereof.

Figure 3 is a sectional view taken substantially on the line 3—3 of Figure 2.

Figures 4 and 5 are perspective views of the cutter carrying jaws of the implement shown in Figure 2.

Figure 6 is a perspective view of the cutter carried by the jaw shown in Figure 5; and Figure 7 is a side elevation of the collapsed and closed end of a receptacle and showing the manner of deflecting laterally the severed portion of the receptacle to provide a free and unobstructed opening for the pouring of the contents from the receptacle through the opening or to engage a tube therein.

The embodiment of the invention shown in Figures 2 to 6 comprises a pair of jaws 13, 14, arranged at one end of a pair of levers pivotally connected intermediate the ends, as at 15, the ends 16 of the levers opposite the jaws being arranged as manipulating hand grips. The levers may be suitably constructed as by casting or stamping and drawing up from sheet material. The faces of the jaws are flat with a reinforcing flange extending about and rearwardly therefrom. A male cutter member comprising a block 17 is fixed as by pins 18 to the face of one jaw, as 14, extended beyond the end of the other jaw 13.

The cutting edge of the cutter block in cross sectional shape, has two sides 23, 24 arranged at a right angle and an arcuate side 25, the edge of which arcuate side constitutes the cutting edge of the arcuate side and the side 24 inclining from the side 23 to the point formed by the arcuate cutting edge converging toward the cutting edge 24, as shown at 26 in Figures 5 and 6. The opposite jaw 13 is reduced in length, as shown in Figure 4, and the female cutter member comprises a right angle bar 27 of square or rectangular shape in cross section with the juncture of the angle portions arranged of arcuate shape to correspond with the arcuate edge 25 of the cutter block. The one angle portion is of greater length than the other angle portion and whereby it is fixed, as by pins 30, to the bottom of the jaw 13, as at 28, with a reinforcing block 29 interposed between the flange portions of said jaw. The other angle portion 27 of said cutter is spaced from the end of the jaw 13 a distance slightly greater than the width of the cutter block between the arcuate and straight sides 25, 24, and the arcuate bend co-operating with the arcuate cutting edge 25 to make an incision conforming with said cutting edge.

This implement is particularly adapted for making a perforation in the side and adjacent the top of the receptacle, and to position said receptacle in predetermined relation to the top thereof a gauge or stop member is provided, and shown as comprising a right angle member 31 fixed at one angle portion to the outer side of the free end of the angle portion 27 with the other angle portion extending inward toward the other jaw 14. A gauge member is also provided to limit the width of the incision, said stop being in the form of a stop pin 32 fixed in and extending inward from the cutter member 27 substantially in line with the end of the jaw 13 and in a plane below the jaw 14.

In the method of forming the perforation or opening in the receptacle R the jaw end of the levers are spread when the collapsed and closed receptacle end is engaged between the jaws with the stop 31 abutting the top and the stop 32 abutting the side of the receptacle, said stops serving to position the perforation in predetermined relation to the top of the receptacle and the depth thereof with relation to the side of the receptacle when a force is applied to the manipulating hand grip ends of the levers to move the jaws together effecting an incising of the material of the receptacle and the deflecting of the severed portion laterally, as shown at 33 in Figures 1 and 7, and providing a free and unobstructed opening 34 in the receptacle through which the contents of the receptacle may be poured or for the insertion of a straw 35.

Having thus described my invention, I claim:

1. In means for forming an opening in the collapsed and closed end of a receptacle, a pair of levers pivotally connected intermediate the ends having one end arranged as manipulating hand grips and the other ends as jaws between which a collapsed portion of the receptacle is adapted to be engaged, a male cutter block fixed to and projecting from the inner face of one jaw with the face of the cutter inclining laterally with respect to the jaw, a female cutter arranged on the other jaw, said male cutter block having an arcuate edge adapted to co-operate with the cutting edge of the female cutter to effect an incision progressively inward from the side of the receptacle and upward and simultaneously deflect the severed portion laterally of the receptacle away from the opening formed by the severed portion, and means arranged on one cutter to engage with the collapsed end and a side of the receptacle to arrange the opening in predetermined position relative to the collapsed end and limit the width thereof inward from the side of the receptacle.

2. Means for forming an opening in the collapsed and closed end of a receptacle as claimed in claim 1, wherein the means to predeterminedly position the opening in the receptacle is provided on the female cutter and comprises a pair of stops one extended laterally of the cutter and to overhang the space between the jaws to engage the top of the receptacle and the other stop extended from said cutter toward the other cutter to engage the side of the receptacle.

3. Means for forming an opening in the collapsed and closed end of a receptacle as claimed in claim 1, wherein the female cutter is of right angle form secured at one angle portion to the jaw with the other angle portion extending in the plane of and spaced from the end of the jaw, and the means to position the opening in predetermined relation to the top and limit the width thereof inward from the side of the receptacle comprises a stop extended from the end of the free angle portion of the female cutter and inward toward the other jaw adapted to engage the top of the receptacle, and a stop positioned inward of said cutter and extending laterally toward the other jaw to engage the side of the receptacle.

LEWIS B. WINTON.